3,311,588
7-NITROSO IMIDAZOLIDINE THIONES AS STABILIZERS FOR DIENE ELASTOMERS AND THEIR VULCANIZATES
Wendell S. Cook, Canal Fulton, Ohio, assignor to The Firestone Tire & Rubber Company, Akron, Ohio, a corporation of Ohio
No Drawing. Original application Aug. 11, 1964, Ser. No. 388,943, now Patent No. 3,275,650, dated Sept. 27, 1966. Divided and this application June 9, 1965, Ser. No. 462,722
9 Claims. (Cl. 260—45.8)

This application is a division of Cook Ser. No. 388,943 filed Aug. 11, 1964, now U. S. Patent No. 3,275,650, which is a continuation-in-part of Oberster and Cook Ser. No. 163,896 filed Jan. 2, 1962, now U.S. Patent No. 3,205,194.

This invention relates to the use of 7-nitroso derivatives of imidazolidine thiones as stabilizers for polymers and their vulcanization. It includes the stabilized polymers and vulcanizates.

Various derivatives of imidazolidine-4-thiones are known in the literature.

The 7-nitroso derivatives of 7,14-diazadispiro-[5.1.5.2]-pentadecane-15-thione and lower alkyl derivatives thereof substituted on methylene groups which are connected to two other methylene groups are stabilizers of conjugated hydrocarbon diene elastomer emulsion polymers, for example, BR (butadiene rubbers), SBR (styrene-butadiene rubbers), NBR (nitrile-butadiene rubbers), ABR (acrylate-butadiene rubbers) and IR (isoprene rubbers, synthetic), and their vulcanizates. Such alkyl derivatives are prepared from lower alkyl derivatives of the parent compound, by the procedure set forth in Example 1. The polymers and their vulcanizates are prepared in any usual manner, and the stabilizer is added at a convenient stage, preferably just prior to coagulation of the polymer or polymers.

The stabilizers of this invention include the 7-nitroso derivatives of the following which are illustrative:

3,11-dimethyl-7,14-diazadispiro-[5.1.5.2]-pentadecane-15-thione
3,11-di-t-butyl-7,14-diazadispiro-[5.1.5.2]-pentadecane-15-thione
3,11-di-t-amyl-7,14-diazadispiro-[5.1.5.2]-pentadecane-15-thione
3,11-di-n-butyl-7,14-diazadispiro-[5.1.5.2]-pentadecane-15-thione
2,10-dimethyl-7,14-diazadispiro-[5.1.5.2]-pentadecane-15-thione
2,10-di-n-butyl-7,14-diazadispiro-[5.1.5.2]-pentadecane-15-thione
2,10-di-tt-octyl-7,14-diazadispiro-[5.1.5.2]-pentadecane-15-thione
3,11-dicyclohexyl-7,14-diazadispiro-[5.1.5.2]-pentadecane-15-thione
3,11-diisopropyl-7,14-diazadispiro-[5.1.5.2]-pentadecane-15-thione
2,10-diethyl-7,14-diazadispiro-[5.1.5.2]-pentadecane-15-thione
2,4,10,12-tetramethyl-7,14-diazadispiro-[5.1.5.2]-pentadecane-15-thione
2,3,10,11-tetraethyl-7,14-diazadispiro-[5.1.5.2]-pentadecane-15-thione The following examples illustrate more particularly the preparation of 7- and 14-nitroso-7,14-diazadispiro-[5.1.5.2]-pentadecane-15-thiones and their use in SBR. The 7-nitroso derivative can be used as a stabilizer in SBR and the other polymer rubbers referred to herein and their vulcanizates. The 7-nitroso derivatives of the lower alkyl derivatives to which reference has been made are useful as stabilizers in all of these polymers and vulcanizates. The 14-nitroso derivatives are not suitable for use as stabilizers. The 7-nitroso derivatives are non-staining and polymers containing them age with substantially no discoloration.

The parent compound, 7,14-diazadispiro-[5.1.5.2]-pentadecane-15-thione has the following formula:

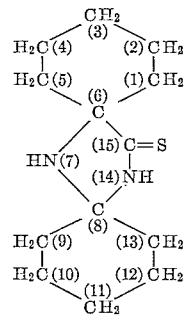

The following examples illustrate the preparation of the 7- and 14-nitroso derivatives:

*Example 1.—7-nitroso derivative of 7,14-diazadispiro-[5.1.5.2]-pentadecane-15-thione*

A solution of 23.8 grams of the parent compound in 1000 ml. of glacial acetic acid was prepared by heating the mixture to about 60° C. The solution was cooled to room temperature and filtered to remove a slight amount of insoluble material. The solution was then stirred slowly and 9.6 grams of sodium nitrite was added over a period of about one hour. At the end of the addition, a thick crystal mass had formed in the flask. The product was collected on a filter and washed with cold water. The product was air dried. It weighed 24.3 grams and melted at 208–211° C.

*Analysis.*—Calc'd for $C_{13}H_{21}N_3SO$: C, 58.40; H, 7.92; S, 11.99. Found: C, 58.93; H, 7.82; S, 11.96.

*Example 2.—14-nitroso derivative of 7,14-diazadispiro-[5.1.5.2]-pentadecane-15-thione*

A solution of 11.9 grams of the parent compound in 500 ml. of glacial acetic acid was prepared by heating the mixture to about 60° C. To this warm solution was added 13 ml. of concentrated hydrochloric acid. Some material precipitated out at this point. Seven grams of sodium nitrite was added in small portions over a one hour period. The reaction mixture was then left at room temperature for several hours with occasional stirring. The reaction mixture was filtered and the product air dried. Eleven and one-half grams of product was obtained and melted with vigorous decomposition at 206–210° C. A mixed melting point with the product obtained in Example 1 (M.P. 208–211° C.) resulted in a lowering of the melting point to 197–214° C.

*Analysis.*—Calc'd for $C_{13}H_{21}N_3SO$: C, 58.40; H, 7.92; S, 11.99. Found: C, 58.97; H, 7.92; S, 11.94.

The position of the nitroso group in the isomeric compounds described in Examples 1 and 2 above was established using Nuclear Magnetic Resonance spectral data.

In the following tables comparison has been made with a widely used commercial stabilizer for SBR polymer which is identified as Stabilizer I, and 7- and 14-nitroso derivatives of the parent compound were tested and compared with the parent compound, these latter stabilizers being identified in the following tables as:

Stabilizer A=7-nitroso derivative of 7,14-diazadispiro-[5.1.5.2]-pentadecane-15-thione.

Stabilizer B=14-nitroso derivative of 7,14-diazadispiro-[5.1.5.2]-pentadecane-15-thione.
Stabilizer C=The parent compound 7,14-diazadispiro-[5.1.5.2]-pentadecane-15-thione.

In the tests 1.25 parts of Stabilizer I per 100 parts of SBR were employed, and for the imidazolidine thione stabilizers only 0.5 part per 100 parts of SBR. The stabilizers were added to the SBR latexes prior to coagulation.

In Table I, the effects of oven aging SBR polymer containing stabilizers of this invention and the commercial stabilizers are compared before and after aging four days in an air circulating oven at 70° C.

TABLE I.—POLYMER STABILIZATION

|  | Surface Rating | | Mooney Viscosity | |
| --- | --- | --- | --- | --- |
|  | Orig. | 4 Days | Orig. | 4 Days |
| Polymer+Stabilizer A | OK | OK | 53.0 | 49.5 |
| Polymer+Stabilizer B | OK | Resinified | 52.5 | |
| Polymer+Stabilizer C | OK | OK | 53.5 | 55.5 |
| Polymer+Stabilizer I | OK | OK | 48.0 | 49.0 |

The foregoing data shows that the 7-nitroso derivative is a good polymer stabilizer, but the 14-nitroso derivative is not a polymer stabilizer.

Table II shows the normal and aged physical properties of vulcanizates obtained from SBR polymer containing Stabilizers A, C and I, respectively, in the different amounts previously described when compounded as indicated in the heading of the table. The various stocks were cured for 30 minutes at 300° F. The table includes Mooney scorch data in which abbreviations are used as follows:

$Vm$=Mooney at minimum viscosity.
$Ts(VM+1)$=Time to start of cure which is the time in minutes required for increase in the Mooney of the stock from minimum viscosity to 1 Mooney unit above minimum viscosity.
$Tc(Vm+10)$=Time to substantial cure which is the time in minutes required for increase in the Mooney of the stock from minimum viscosity to 10 Mooney units above minimum viscosity.

TABLE II

|  | A | I | C |
| --- | --- | --- | --- |
| Polymer+Stabilizer A | 100 | | |
| Polymer+Stabilizer I | | 100 | |
| Polymer+Stabilizer C | | | 100 |
| HAF Black | 50 | 50 | 50 |
| Oil | 8 | 8 | 8 |
| Stearic Acid | 1.5 | 1.5 | 1.5 |
| Zinc Oxide | 3.0 | 3.0 | 3.0 |
| Accelerator | 1.0 | 1.0 | 1.0 |
| Sulfur | 1.75 | 1.75 | 1.75 |
| Total | 165.25 | 165.25 | 165.25 |
| Normal Stress-Strain: | | | |
| 300% Modulus, p.s.i | 2,125 | 2,200 | 2,000 |
| Tensile, p.s.i | 3,200 | 2,250 | 3,050 |
| Elongation, percent | 410 | 410 | 410 |
| Aged 2 Days at 212° F.—Oven: | | | |
| 200% Modulus, p.s.i | 2,525 | | |
| Tensile, p.s.i | 2,750 | 2,575 | 2,500 |
| Elongation, percent | 210 | 190 | 190 |
| Aged 5 hrs. at 260° F.—Air Bomb: | | | |
| 200% Modulus, p.s.i | | | |
| Tensile, p.s.i | 1,100 | 825 | 650 |
| Elongation, percent | 120 | 80 | 70 |
| Mooney Scorch at 275° F.: | | | |
| Ts(Vm+1) | 24.5 | 22.5 | 17.5 |
| Tc(Vm+10) | 29.5 | 30.5 | 22.5 |
| Vm | 19.75 | 19.0 | 20.75 |

The results show that the 7-nitroso derivative has excellent scorch resistance properties compared to the parent compound.

It is to be noted that in the various tests the amount of the commercial stabilizer was 2.5 times that of the stabilizers of this invention.

The examples are illustrative. The amount of stabilizer used will in general be between 0.1 and 10 parts per hundred parts of the polymer or vulcanizate, by weight.

What I claim is:

1. The method of stabilizing conjugated hydrocarbon diene elastomer emulsion polymer which comprises adding to an emulsion of the polymer before coagulation a stabilizing amount of an imidazolidine derivative of the class consisting of the compound having the formula

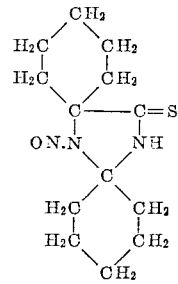

and lower alkyl derivatives thereof substituted on methylene groups which are connected to two other methylene groups, thereafter coagulating the emulsion and thereby incorporating stabilizer in the polymer, and then subjecting the resulting polymer composition to heat aging.

2. The method of stabilizing the vulcanizate of a conjugated hydrocarbon diene elastomer emulsion polymer which comprises vulcanizing the same in the presence of a stabilizing amount of an imidazolidine derivative of the class consisting of the compound having the formula

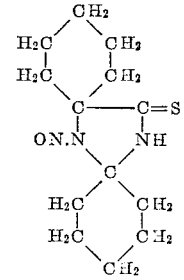

and lower alkyl derivatives thereof substituted on methlyene groups which are connected to two other methylene groups.

3. The method of claim 2 in which the vulcanizate is styrene-butadiene rubber vulcanizate.

4. The method of claim 2 in which the vulcanizate is styrene-butadiene rubber vulcanizate and the stabilizer is 7 - nitroso-7,14-diazadispiro-[5.1.5.2]-pentadecane-15-thione.

5. A product of the class consisting of conjugated hydrocarbon diene elastomer emulsion polymers and vulcanizates thereof stabilized with an imidazolidine derivative of the class consisting of the compound having the formula

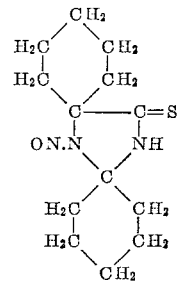

and lower alkyl derivatives thereof substituted on methylene groups which are connected to two other methylene groups.

6. The product of claim 5 in which the product is a polymer.

7. The product of claim 6 in which the polymer is styrene-butadiene rubber polymer.

8. The product of claim 5 in which the product is a vulcanizate.

9. The product of claim 5 in which the stabilizer is 7 - nitroso - 7,14 - diazadispiro-[5.1.5.2]-pentadecane-15-thione.

References Cited by the Examiner
UNITED STATES PATENTS 2,806,036  9/1957  Christian _____ 260—309.7

LEON J. BERCOVITZ, *Primary Examiner.*

DONALD E. CZAJA, *Examiner.*

M. J. WELSH, *Assistant Examiner.*